(12) United States Patent
Bilal et al.

(10) Patent No.: US 11,805,041 B2
(45) Date of Patent: Oct. 31, 2023

(54) IN-MEMORY MANAGEMENT SYSTEM AND METHOD USING USER TRAFFIC

(71) Applicant: HANKUK UNIVERSITY OF FOREIGN STUDIES RESEARCH & BUSINESS FOUNDATION, Yongin-si (KR)

(72) Inventors: Muhammad Bilal, Yongin-si (KR); Anand Nayyar, Da Nang (VN); Mayank Tiwary, Odisha (IN); Kshira Sagar Sahoo, Amaravati (IN); Bibhudatta Sahoo, Rourkela (IN)

(*) Notice: Subject to any disclaimer, the term of this patent is extended or adjusted under 35 U.S.C. 154(b) by 168 days.

(21) Appl. No.: 17/541,277

(22) Filed: Dec. 3, 2021

(65) Prior Publication Data
US 2023/0179500 A1 Jun. 8, 2023

(51) Int. Cl.
| G06F 15/173 | (2006.01) |
| H04L 43/0876 | (2022.01) |
| H04L 43/04 | (2022.01) |
| G06F 16/2455 | (2019.01) |
| G06F 16/27 | (2019.01) |
| G06F 9/455 | (2018.01) |

(52) U.S. Cl.
CPC ...... *H04L 43/0876* (2013.01); *G06F 9/45558* (2013.01); *G06F 16/24552* (2019.01); *G06F 16/278* (2019.01); *H04L 43/04* (2013.01); *G06F 2009/45595* (2013.01)

(58) Field of Classification Search
CPC . H04L 43/0876; H04L 43/04; H04L 41/0896; H04L 41/0895; H04L 41/40; H04L 43/20; H04L 43/16; G06F 9/45558; G06F 16/24552; G06F 16/278; G06F 2009/45595; G06F 2009/45591
See application file for complete search history.

(56) References Cited

U.S. PATENT DOCUMENTS

| 11,526,504 | B1* | 12/2022 | Moshgabadi | G06F 16/245 |
| 2007/0271570 | A1* | 11/2007 | Brown | G06F 9/5033 707/E17.007 |
| 2013/0275574 | A1* | 10/2013 | Hugard, IV | H04L 63/20 709/224 |
| 2019/0004837 | A1* | 1/2019 | Tiwary | H04L 67/10 |
| 2020/0322226 | A1* | 10/2020 | Mishra | H04L 43/067 |

* cited by examiner

*Primary Examiner* — John B Walsh (57) ABSTRACT

Provided are an in-memory management system and method using user traffic. According to embodiments thereof, traffic bandwidth is monitored for an ERP user who has left an LAN coverage area, by using an OpenFlow-based SDN WAN, and loading or unloading of a table partition set, an SQL Plan cache, and an SQL view cache in an in-memory is managed depending on a result of monitoring, so that the in-memory can be efficiently managed. The user traffic for the ERP user and the user can be monitored through the local network, and loading or unloading of table partitions of the in-memory can be managed on the basis of the monitored user traffic so that the in-memory can be managed regardless of Internet access. Data transmission rate and security can be enhanced because distributed communication is performed over an LAN and a WAN for each user and each ERP user.

16 Claims, 6 Drawing Sheets

| User MAC address | Clustering Timings | Synchronous | Asynchronous | Identify Management module IP | Tenant Public IP's |
|---|---|---|---|---|---|
| | | | | | |

IN-MEMORY MANAGEMENT SYSTEM AND METHOD USING USER TRAFFIC

BACKGROUND OF THE INVENTION

Field of the Invention

The present disclosure relates to an in-memory management system and method using user traffic. More particularly, the present disclosure relates to a technology for monitoring user traffic with an OpenFlow-based SDN WAN when a user leaves a LAN and for loading and unloading tables and table partitions of an in-memory DB on the basis of the monitored user traffic.

Description of the Related Art

A database system has different optimum system structures and data storage management methods depending on whether a workload is for transaction processing or for analysis processing.

Generally, a distributed in-memory database system for analysis processing uses a shared-nothing architecture in which a database is partitioned to minimize data sharing between distributed nodes, a data partition is assigned for each node, and data is managed independently for each node.

That is, each node has a structure that is exclusively responsible for managing the partial database assigned to the node, and has a structure in which the node hands over data request processing with respect to data managed by other nodes and receives and uses a result of processing.

In a node, multiple query processing threads operate in a processing-oriented manner that is accessible to all pieces of in-memory data managed in the node, and the access speeds to all pieces of data physically in the node are considered to be the same.

A general in-memory management system loads pre-stored table partitions, an SQL Plan cache, and an SQL view cache according to incoming commands.

However, in a case of request commands for real-time queries, a loading delay of table partitions occurs. In order to prevent the loading delay, when memory usage rate reaches 95%, the in-memory management system unloads the least used table partitions and deletes the same from the memory.

In the in-memory management system, loading or unloading of table partitions is independent of the user's network activity. Therefore, there is no synchronization between a network controller for monitoring the user's network activity and the in-memory, so an ERP user who has left the coverage of the LAN is not provided with an Internet-based service, unfortunately.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an in-memory management system and method using user traffic, wherein traffic bandwidth is monitored for an ERP user who has left a LAN coverage area, by using an OpenFlow-based SDN WAN, and loading or unloading of a table partition set, an SQL Plan cache, and an SQL view cache in an in-memory is managed depending on a result of monitoring, so that the in-memory is efficiently managed.

Accordingly, the present disclosure monitors user traffic for an ERP user and a user through a local network, and manages loading or unloading of table partitions of an in-memory on the basis of the monitored user traffic so that the in-memory is managed regardless of Internet access.

In addition, the present disclosure enhances data transmission rate and security because distributed communication is performed over an LAN and a WAN for each user and each ERP user.

The objectives of the present disclosure are not limited thereto, and the other objectives and advantages of the present disclosure which are not described will be understood from the following description and become apparent by the embodiments of the present disclosure. In addition, it is understood that the objectives and advantages of the present disclosure may be implemented by components defined in the appended claims or their combinations.

According to an aspect of the present disclosure, there is provided an in-memory management system using user traffic, the system including: at least one enterprise resource planning (ERP) backend virtual machine (VM) performing marking and clustering on all queries by using, as inputs, an input query log of a user, a predetermined minimum number of queries, and a predetermined minimum time gap; a network controller monitoring traffic bandwidth during clustering timings determined with a maximum time and a minimum time of clusters for the marked queries of the user; and at least one in-memory DB provided in number the same as the at least one ERP backend VM, the least one in-memory DB managing loading or unloading of a table partition set, a Structured Query Language (SQL) Plan cache, and an SQL view cache on the basis of the traffic bandwidth of the user monitored by the network controller, and managing a query (Q) table.

According to another aspect of the present disclosure, there is provided an in-memory management method using user traffic and being performed by the in-memory management system of claim 1, the method including: performing, by the at least one enterprise resource planning (ERP) backend virtual machine (VM) at a clustering step, making and clustering on all the queries by using, as inputs, the input query log of the user, the predetermined minimum number of queries, and the predetermined minimum time gap; monitoring, by the network controller at a monitoring step, the traffic bandwidth of the user during the clustering timings determined with the maximum time and the minimum time of the clusters for the marked queries of the user; and managing, by the at least one in-memory DB provided in number the same as the at least one ERP backend VM at an in-memory management step, loading or unloading of the table partition set, the Structured Query Language (SQL) Plan cache, and the SQL view cache on the basis of the traffic bandwidth of the user monitored by the network controller, and managing the query (Q) table.

Preferably, the clustering step includes: initializing neighbor queries into a null state on the basis of a random query that is randomly selected among all the queries of the user; marking the selected random query when the selected random query unmarked and conditions about the predetermined minimum number of queries and the predetermined minimum time gap are satisfied, and marking all the neighbor queries of the random query and adding the neighbor queries to the cluster; and informing the network controller about the maximum time and the minimum time of the clusters for all the queries via the in-memory DB after marking and clustering of all the queries of the user are completed.

Preferably, the Q table includes at least one selected from the group of a MAC address of the marked user, the clustering timings determined with the maximum time and the minimum time of the clusters, synchronous and asynchronous communication, an IP address of an ID management module managing the MAC address of the user, and an ERP public internet protocol (IP).

Preferably, at the monitoring step, when the user is in a LAN coverage area, the user is identified using a user MAC address of an ID management module during the clustering timings through an OpenFlow-based SDN, and the traffic bandwidth of the user is monitored.

Preferably, the monitoring step includes: starting monitoring of the traffic bandwidth of the user during the clustering timings of the user, and removing all flow entries of the user; acquiring a flow entry of an OpenFlow table when loading of a default table partition set of the user, the SQL Plan cache, and the SQL view cache stored in the in-memory DB fails, and monitoring the traffic bandwidth of the user; and informing the in-memory DB about the monitored traffic bandwidth of the user.

Preferably, the monitoring step includes: adding, when a Packet-In message is received on the basis of the OpenFlow during monitoring of the traffic bandwidth of the user, a flow entry with the received Packet-In message; processing a packet received through the added flow entry; identifying the user with a user MAC address of the processed packet and monitoring the traffic bandwidth of the user; and informing the in-memory DB about the monitored traffic bandwidth of the user.

Preferably, the informing of the in-memory DB about the traffic bandwidth of the user includes: informing of the in-memory DB that the user traffic is equal to or lower than a predetermined threshold value when the traffic bandwidth of the user is equal to or lower than the threshold value, and removing the generated flow entry by using a flow modification packet; and updating the in-memory DB with the traffic bandwidth of the user when the user traffic is higher than the threshold value and communication between the network controller is the in-memory DB is synchronous communication, and receiving a reply message of the in-memory DB, and adding a flow entry to a flow table.

Preferably, the informing of the in-memory DB about the traffic bandwidth of the user includes: informing the in-memory DB about the traffic bandwidth of the user that is a result of monitoring when the traffic bandwidth of the user is higher than the threshold value and communication between the network controller and the in-memory DB is asynchronous communication; and adding the flow entry to the flow table.

Preferably, the traffic bandwidth is measured as a difference in an OpenFlow start reply packet that is received through the SDN after an OpenFlow start request packet is transmitted to the SDN on the basis of the OpenFlow.

Preferably, the monitoring step further includes monitoring traffic of an ERP user through the OpenFlow-based SDN with the MAC address of the ERP user acquired on the basis of loading of a partition of a default table of the in-memory DB, wherein the ERP user is a user who has left the LAN coverage area and makes a request for ERP access through a WAN during non-clustering timings.

Preferably, the monitoring step includes: making, when there is an access request in ERP through the WAN and an ERP IP for which the access request is made is not present in a flow entry of an OpenFlow table, a request to the in-memory DB for the ERP IP by using a Packet-In message based on the OpenFlow, and waiting for reception; loading the partition of the default table pre-stored in the in-memory DB; monitoring the traffic bandwidth of the ERP user with the MAC address and identification information of the ERP user stored in a partition set of the default table; and informing the in-memory DB about the traffic bandwidth of the ERP user when communication between the network controller and the in-memory DB is synchronous communication, and receiving a reply message of the in-memory DB, and adding a flow entry of the OpenFlow table.

Preferably, the monitoring step further includes informing the in-memory DB about the traffic bandwidth of the ERP user when communication between the network controller and the in-memory DB is asynchronous communication, and adding the flow entry of the OpenFlow table.

Preferably, at the in-memory management step, a login message of the user received from outside through asynchronous communication or synchronous communication is loaded to the table partition set of the in-memory DB, and is loaded to the SQL Plan cache and to the SQL view cache, and the Q table is updated.

Preferably, at the in-memory management step, when the user is another user stored in the table, the table partition set, the SQL Plan cache, and the SQL view cache of the in-memory DB are moved to delta storage and the Q table is updated.

Preferably, at the in-memory management step, when the user is not another user stored in the table, an unused partition of the table is moved to the delta storage.

According to the present disclosure, traffic bandwidth is monitored for an ERP user who has left an LAN coverage area, by using an OpenFlow-based SDN WAN, and loading or unloading of a table partition set, an SQL Plan cache, and an SQL view cache in an in-memory is managed depending on a result of monitoring, so that the in-memory can be efficiently managed.

Accordingly, the present disclosure can monitor user traffic for an ERP user and a user through a local network, and can manage loading or unloading of table partitions of an in-memory on the basis of the monitored user traffic so that the in-memory can be managed regardless of Internet access.

In addition, the present disclosure can enhance data transmission rate and security because distributed communication is performed over an LAN and a WAN for each user and each ERP user.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings, in which.

DETAILED DESCRIPTION OF THE INVENTION

Hereinafter, an in-memory management system using a network traffic state according to the present disclosure will be described in detail with reference to the accompanying drawings. In describing the present disclosure, if it is decided that a detailed description of known functions or configurations related to the present disclosure makes the gist of the present disclosure unclear, the detailed description will be omitted. The terminologies used herein to appropriately describe exemplary embodiments of the present disclosure may vary depending on the intention of a user, an operator, or a manager or on the custom in the field to which the present disclosure pertains. Therefore, the definition of the terms should be based on the contents throughout this specification.

Prior to the description of the present disclosure, some terms used herein will be clarified. In the present disclosure, the term "user" also refers to a terminal that a user who is in an LAN coverage area has. The term "ERP user" also refers to a terminal through which a user who has left the LAN coverage area makes an access request in ERP.

In the description of the disclosure, a subject that performs an operation may be an in-memory management processor that manages a table partition set, an SQL Plan cache, and an SQL view cache, using a result of monitoring a user traffic bandwidth. As another example, the subject may be a recording medium on which a program for performing a measurement and processing process is recorded, or a device including the recording medium.

Figure 1:
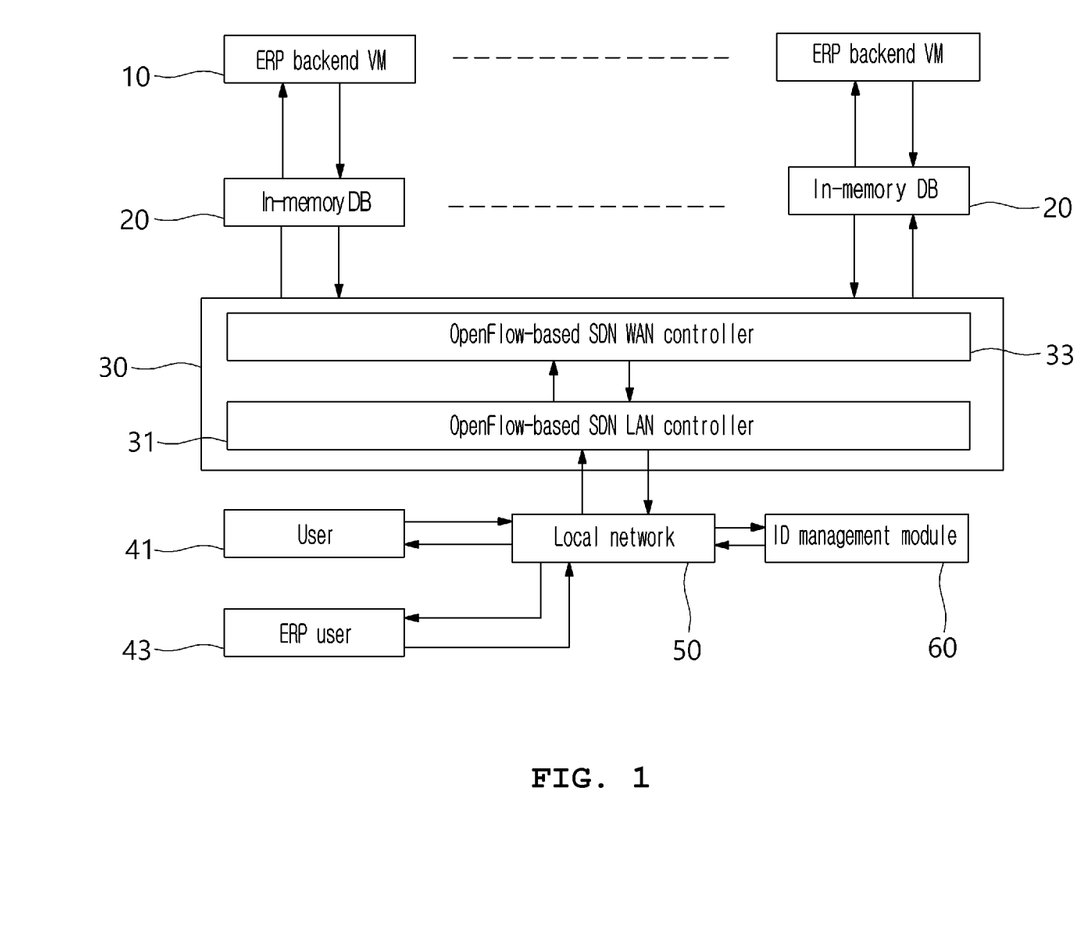
FIG. 1 is a configuration diagram illustrating an in-memory management system according to an embodiment.
Figure 2:
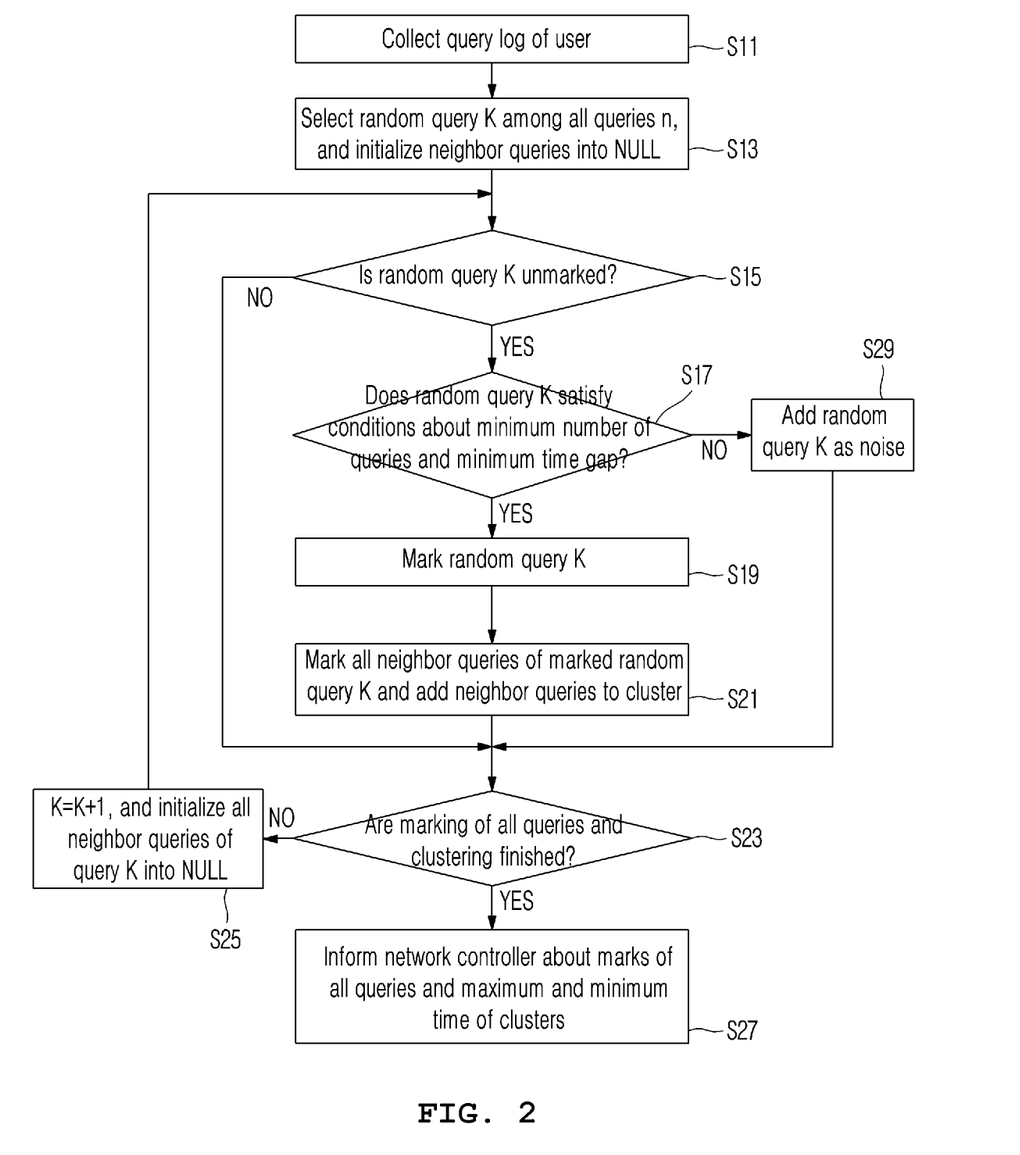
FIG. 2 is a flowchart illustrating an operation process of an ERP backend VM of FIG. 1.
Figure 3:
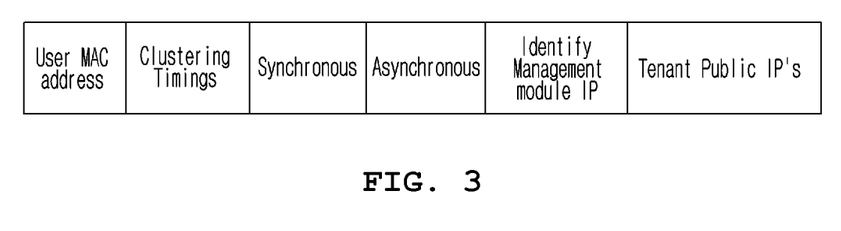
FIG. 3 is an exemplary diagram illustrating a structure of a Q table in an in-memory DB of FIG. 1.
Figure 4A:
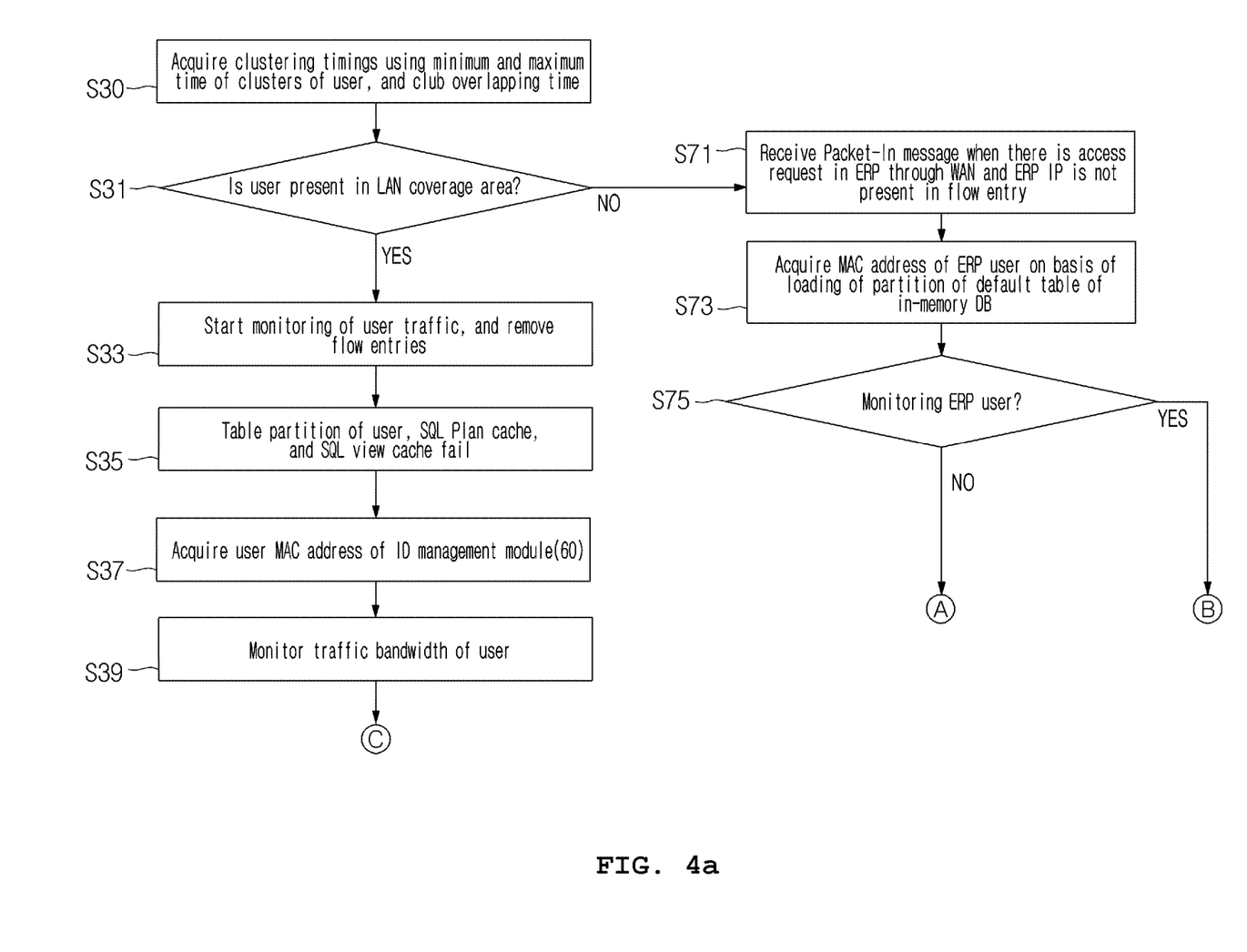
FIG. 4a and FIG. 4b are a flowchart illustrating an operation process of a network controller of FIG. 1.
Figure 4B:
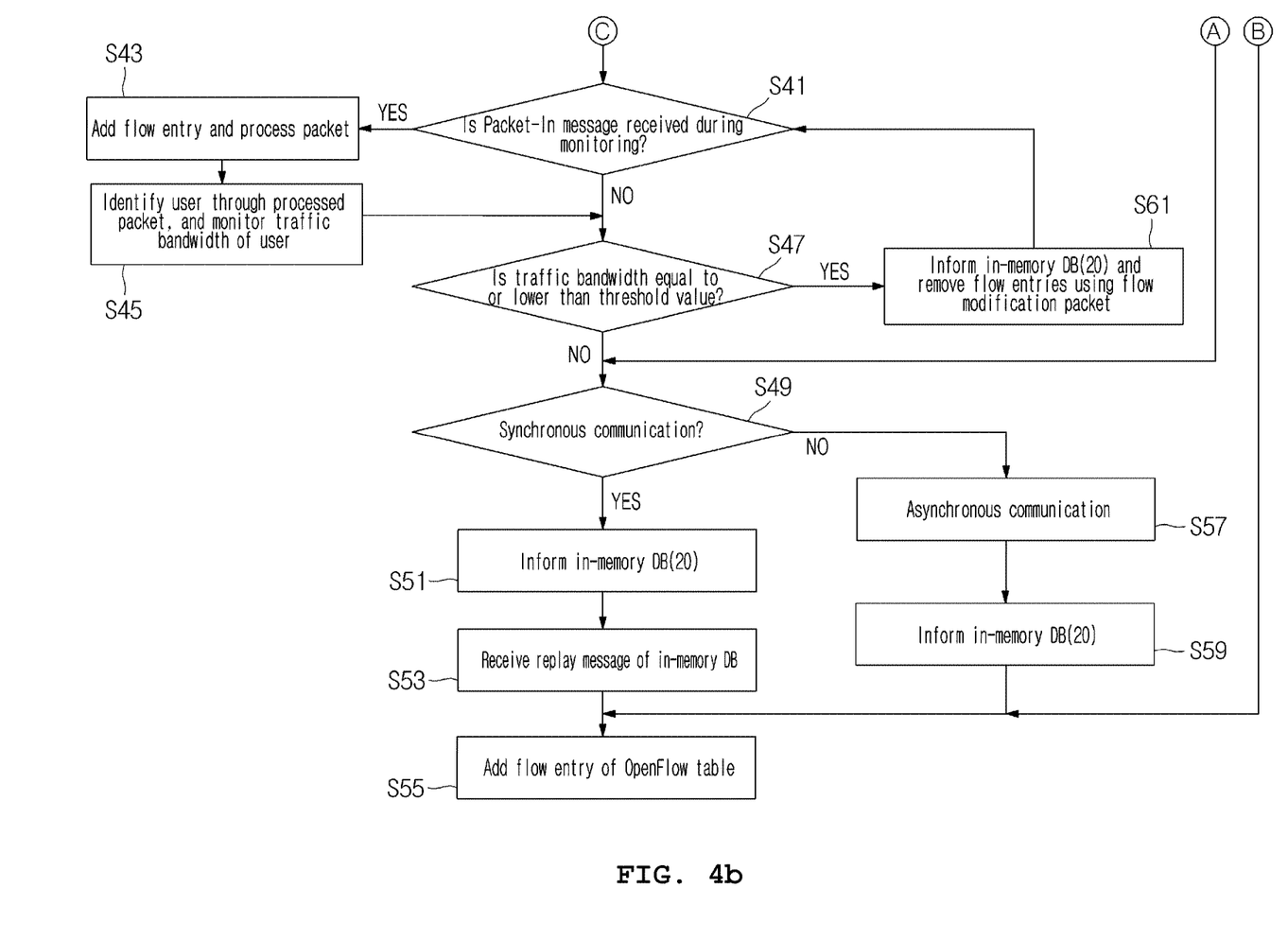
Figure 5:
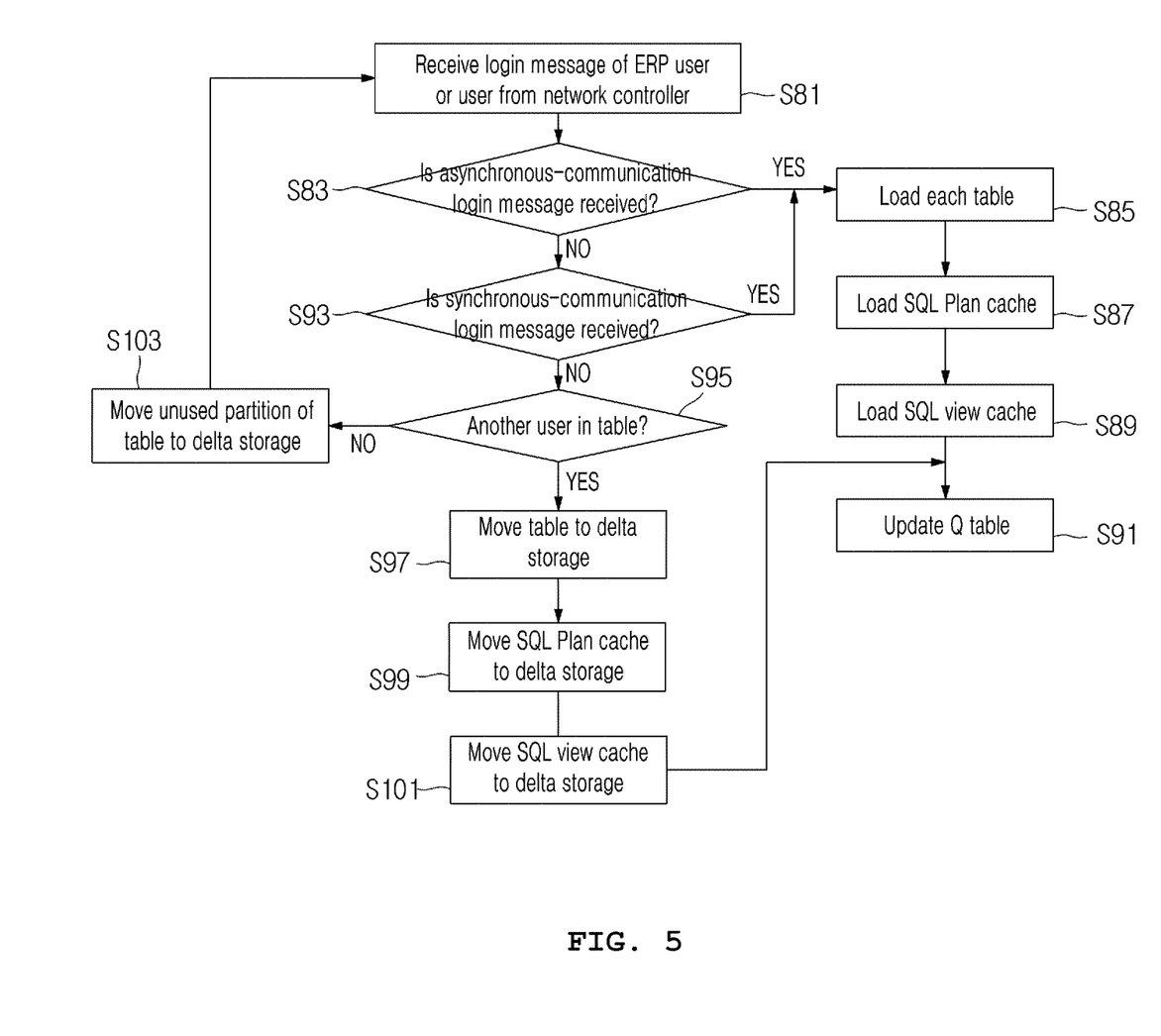
FIG. 5 is a flowchart illustrating an operation process of an in-memory DB in FIG. 1.

FIG. 1 is a configuration diagram illustrating an in-memory management system using user traffic according to an embodiment. FIG. 2 is a flowchart illustrating an operation process of an ERP backend VM 10 of FIG. 1. FIG. 3 is an exemplary embodiment illustrating a structure of a Q table in an in-memory DB 20 of FIG. 1. FIG. 4a and FIG. 4b are a flowchart illustrating the operation of a LAN controller 31 of an OpenFlow-based SDN and a WAN controller 33 of an OpenFlow-based SDN of a network controller 30 of FIG. 1. FIG. 5 is a flowchart illustrating the operation of the in-memory DB 20 of FIG. 1.

Referring to FIGS. 1 to 5, according to an embodiment, an in-memory management system using user traffic has a configuration for managing a default table partition set, an SQL Plan cache, an SQL view cache, and a Q table in an in-memory DB on the basis of traffic bandwidth of a user or an ERP user collected by a network controller 30. The system may include at least one of the following: at least one enterprise resource planning (ERP) backend virtual machine (VM) 10, at least one in-memory DB 20, the network controller 30, an ERP user 41, a user 43, a local network 50, and an ID management module 60.

Herein, the ERP backend VM 10 consists of at least one running ERP instance, and the in-memory database (DB) 20 is informed of the ERP instance. Herein, the ERP backend VM 10 clusters the density in the time domain for an input query log of a terminal (hereinafter, also referred to as a user 41) the user owns, to generate clusters and marks for user queries, and informs the network controller 30 of the generated clusters via the in-memory DB 20. Therefore, the clusters for the user queries may include a query performed at a predetermined particular time.

Hereinafter, the operation process of the ERP backend VM 10 for performing clustering on the basis of the density in the time domain for the input user query log will be described in detail with reference to FIG. 2.

First, the ERP backend VM 10 performs clustering on all user queries by using, as inputs, the user query log, a predetermined minimum number of queries min_queries, and a predetermined minimum time gap min_time. Herein, min_queries means the minimum number of queries that may put in a cluster, and the minimum time gap min_time is set as the minimum time gap between the center query of the cluster and another query at step S11. That is, as the minimum number of queries min_queries and the minimum time gap min_time, the values applied in the in-memory management system may be applied. In the present disclosure, the minimum number of queries min_queries and the minimum time gap min_time are not specifically clarified, but should be understood by a person skilled in the art.

The ERP backend VM 10 selects any query randomly among all input user queries n and initializes neighbor queries Neighbors into a NULL state on the basis of the selected random query K, at step S13. It is checked whether the random query K is marked or not at step S15. When the random query K is not marked, it is checked whether conditions about the minimum number of queries min_queries and the minimum time gap min_time are satisfied at step S17.

When the conditions about the minimum number of queries min_queries and the minimum time gap min_time are satisfied, the ERP backend VM 10 marks the random query K and adds the same to the cluster at step S19. Any query is randomly selected among the neighbor queries Neighbors, and all the neighbor queries are marked and added to the cluster at step S21.

When the random query K is marked, the ERP backend VM 10 repeatedly performs the following: randomly selecting one of all the remaining queries except the random query K, initializing all neighbor queries of the selected query into a NULL state, marking the selected query, and adding the same to the cluster, at steps S23 and S25. After marking all the queries and adding the same to the cluster, the network controller 30 is informed of the marks for all the queries and the maximum time and the minimum time of the clusters via the in-memory DB 20 at step S27.

In the meantime, when the random query K does not satisfy the conditions about the minimum number of queries min_queries and the minimum time gap min_time, the ERP backend VM 10 regards the selected random query K as noise at step S29.

Afterward, the network controller 30 that receives the maximum time and the minimum time of the clusters for the user queries via the in-memory DB 20 and monitors the user traffic, starts monitoring the traffic of the user. A result of monitoring may be used by the in-memory DB 20 to manage a table partition set, a Structured Query Language (SQL) Plan cache, and an SQL view cache.

The in-memory DB 20 manages the default table partition set and the Q table on the basis of the query log for all users loaded each time a packet Packet_In message is received from the network controller 30.

Herein, as shown in FIG. 3, the Q table includes fields, such as a user MAC address, the clustering timings set with the maximum time and the minimum time of the clusters, synchronous communication and asynchronous communication between the network controller 30 and the in-memory DB 20 during the clustering timings and the non-clustering timings except the clustering timings, an IP address (Identity Management Module IP) of the ID management module 60 managing the user MAC address, and an ERP public IP address (Tenant Public IP's). The Q table is stored in the in-memory DB 20. When there is a change in the Q table, all controllers of different layers are informed of the change through mirroring.

In the meantime, the network controller 30 communicates with the in-memory DB 20 in a synchronous mode when the user does not leave the office during the cluster timing received via the in-memory DB 20. Afterward, when recording of the entire traffic of the user is completed, the network controller 30 performs synchronous or asynchronous communication with the in-memory DB 20.

For example, the network controller 30 as shown in FIG. 1 includes an OpenFlow-based software-defined network (SDN) local allocation network (LAN) controller 31, and an OpenFlow-based SDN Wide Allocation Network (WAN) controller 33. That is, the network controller 30 distributes the user traffic to the local network 50 and monitors the distributed user traffic. Herein, the OpenFlow-based SDN that processes network path setting and control, and complex operation management through software programming includes: a switching layer including multiple switches and transmitting data; a control layer for managing and controlling the entire network; and an application layer for providing various network services. The OpenFlow is a standard communication interface between the control layer and a transport layer.

For example, the LAN controller 31 of the OpenFlow-based SDN monitors the user traffic bandwidth (network activity) when the user is in the LAN coverage area. The WAN controller 33 of the OpenFlow-based SDN monitors the traffic bandwidth (network activity) of the ERP user who has left the LAN coverage area, and distributes a result of monitoring to at least one in-memory DB 20 on the basis of the OpenFlow. That is, the network controller 30 informs the in-memory DB 20 about the real-time traffic bandwidth of the user monitored through the OpenFlow-based SDN of either the LAN or the WAN.

Hereinafter, the operation process of the network controller 30 that runs in a control area of the SDN, and informs the in-memory DB 20 about the traffic bandwidth of the user 41 who is in the LAN coverage area during clustering timings or of the ERP user 43 who has left the LAN coverage area during non-clustering timings will be described with reference to FIG. 4a and FIG. 4b.

When the user 41 is in the LAN coverage area, the LAN controller 31 of the OpenFlow-based SDN monitors the user traffic bandwidth. For an ERP user who has left the LAN coverage area and attempts to log into the ERP, the WAN controller 33 of the OpenFlow-based SDN monitors the traffic bandwidth of the ERP user.

First, the LAN controller 31 of the OpenFlow-based SDN extracts the minimum time and the maximum time of clustering and clubs the overlapping time between the start time of a cluster and the end time of the previous cluster at step S30.

Afterward, the LAN controller 31 of the OpenFlow-based SDN starts monitoring the traffic of the user who is in the LAN coverage area during the clustering timings between the minimum time and the maximum time of clustering and removes all the flow entries of the user, at steps S31 and S33.

When receiving of a default table partition set of the user, of an SQL Plan cache, and of an SQL view cache in the in-memory DB 20 fails at step S35, the LAN controller 31 of the OpenFlow-based SDN gets the user MAC address of the ID management module 60 over the local network 50 or maps a user MAC address stored in a table to the ID management module 60 for storage, and monitors the traffic of the user, at steps S37 and S39.

That is, the LAN controller 31 of the OpenFlow-based SDN monitors the traffic bandwidth of the user every predetermined period of time determined as the clustering timings. Herein, the traffic bandwidth is measured as the difference in an OpenFlow start reply packet OFSTART_REPLY PACKET of the OpenFlow received after an OpenFlow start request packet OFSTART_REQUEST PACKET is transmitted to the switch layer of the SDN on the basis of the OpenFlow.

In the meantime, during monitoring of the user traffic by the LAN controller 31 of the OpenFlow-based SDN, when a Packet-In message is received from the OpenFlow at step S41, a flow entry is generated through the Packet-In message and using this, packet processing is performed. The, the user is identified with the user MAC address through the processed packet and the in-memory DB 20 is informed about the user MAC address and the traffic according to set communication, at steps S43 and S45.

Herein, the Packet-In message is a control message that is generated when a flow which does not match flows into the flow entry of the OpenFlow. When the Packet-In message is input, the LAN controller 31 of the OpenFlow-based SDN replies with a packet out or flow add packet to the OpenFlow. The LAN controller 31 of the OpenFlow-based SDN performs addition to the flow entry of the OpenFlow table.

As a result of monitoring the traffic bandwidth of the user, when the traffic bandwidth is higher than a predetermined threshold value and is for synchronous communication, at steps S47 and S49, the LAN controller 31 of the OpenFlow-based SDN updates the in-memory DB 20 with the user traffic, receives a reply message from the in-memory DB 20, and performs addition to the flow entry, at step S51, S53, and S55.

In the case of an asynchronous communication message, the LAN controller 31 of the OpenFlow-based SDN updates the in-memory DB 20 with the user traffic, and adds a flow item without waiting for a reply message from the in-memory DB 20, at steps S57 and S59.

In addition, as a result of monitoring, when the user traffic bandwidth is lower than the threshold value, the LAN controller 31 of the OpenFlow-based SDN informs the in-memory DB 20 that the traffic bandwidth is lower than the threshold value and removes the flow entry using a flow modification packet FLOW_MOD at step S61.

Herein, the operation process of the network controller 30 will be described, wherein when the user who is out of the clustering timings determined with the minimum time and the maximum time of the clusters has left the LAN coverage area and requests login in ERP, the in-memory DB 20 is informed about the monitored traffic of the ERP user.

When the ERP IP of the ERP user 40, which is the user who has left the LAN coverage (the "No" arrow at step S31) and has made a request to the ERP for access, is not present in the flow entry of the flow table, the WAN controller 33 of the OpenFlow-based SDN makes a request to the in-memory DB 20 for the ERP IP by using a Packet-In message and waits for reception at step S71.

Afterward, the WAN controller 33 of the OpenFlow-based SDN activates communication with the in-memory DB 20 and checks loading of a default table partition, an SQL Plan cache, and an SQL view cache in the in-memory DB 20.

The WAN controller 33 of the OpenFlow-based SDN collects the MAC address and the identification information ID of the ERP user 43 stored in the default table partition set received from the in-memory DB 20 that has received a Packet-In message, at step S73, monitors the traffic bandwidth of the identified ERP user 43 at step S75, and adds the flow entry to the flow table.

When the ERP IP matches the flow entry in the flow table, the WAN controller 33 of the OpenFlow-baseflow tabled SDN checks communication with the in-memory DB 20. When the communication is synchronous communication, the WAN controller 33 of the OpenFlow-based SDN informs the in-memory DB 20 about a result of monitoring, receives a reply message, and performs addition to the flow entry, at steps S49, S51, S53, and S55. As another example, in the case of asynchronous communication, the in-memory DB 20 is informed about a result of monitoring and the flow entry is updated, at steps S57 and S59.

That is, the network controller 30 monitors the traffic of the user during the clustering timings and informs the in-memory DB 20 about a result of monitoring.

The in-memory DB 20 manages the table partition set, the SQL Plan cache, and the SQL view cache on the basis of the real-time traffic bandwidth of the user received through the OpenFlow-based SDN.

Hereinafter, a series of processes in which loading of a table partition set, the SQL Plan cache, and the SQL view cache in the in-memory DB 20 is updated with login messages collected from the network controller 30 through synchronous or asynchronous communication will be described with reference to FIG. 5.

The in-memory DB 20 loads a login message of the user received through synchronous communication of the network controller 30 to the table partition set, loads the same to the SQL Plan cache and to the SQL view cache, and updates the Q table, at steps S85, S87, S89, and S91.

When the login message is not an asynchronous-communication login message, the in-memory DB 20 loads the login message to the table partition set, to the SQL Plan cache, and to the SQL view cache, transmits a reply message to the network controller 30, and updates the Q table, at steps S93, S87, S89, and S91.

In the meantime, when the login message is neither synchronous nor asynchronous communication login message, the in-memory DB 20 checks whether the user is another user in the table at step S93. For a different user, the in-memory DB 20 moves the table partition set, the SQL Plan cache, and the SQL view cache of the user to delta storage that is online storage based on delta technology, and updates the Q table, at steps S97, S99, S101, and S91.

When the user is not another user in the table, the in-memory DB 20 moves the table partition set to the delta storage and receives a login message, at steps S103 and S81.

The in-memory DB 20 loads a table partition each time a message is received from the network controller 30 during the clustering timing of user queries. Depending on the size of the table partition, synchronous or asynchronous communication is determined. For example, when the size of the table partition is 3 GB, an asynchronous communication mode is performed. When the size is less than 3 GB, synchronous communication is performed by the in-memory DB 20 on the Q table.

Assuming that the user has clustering timing from 8 to 11 AM and user access table 21 frequently uses partitions 14, 16, and 21, the network controller 30 removes all the flow entries for the respective monitoring users from the flow table and starts monitoring. This means that the flow table does not hold any flow entries for the user.

When a Packet in message is generated in the OpenFlow, the network controller 30 receives all messages of the user including the Packet in message. Once the network controller 30 receives a Packet-In message generated from the user, there is a high probability that the user is going to access table 21, and default partitions 14, 16, and 21.

The network controller 30 transmits the login message to the in-memory DB 20 and selects communication according to the size of the partition in table 21.

However, when the user is out of cluster timing, the network controller 30 monitors the user's network on the basis of the current table partition of the in-memory DB 20.

Herein, the network controller 30 waits to receive a Packet-In message generated in the ERP. After a predetermined threshold time, when the network activity of the user is not shown, the network controller 30 removes all the flow entries from the flow table and informs the in-memory DB 20 of the network activity.

The in-memory DB 20 removes the flow entries when there is no user accessing the same partition.

In the meantime, while queries for extra partition 40 other than partitions 14, 16, and 21 are executed, when the in-memory DB 20 receives a logout message, the in-memory DB 20 moves the least accessed extra partition to delta storage.

According to an embodiment of the present disclosure, the traffic bandwidth of the user or ERP user is monitored. A login message of the user or ERP user of which the traffic bandwidth is higher than the predetermined threshold value as a result of monitoring is loaded to the table partition set, the SQL Plan cache, and the SQL view cache of the in-memory DB, and the Q table is updated. When a login message of another user in the table is received, the table partition set, the SQL Plan cache, and the SQL view cache of the in-memory DB are moved to delta storage and the Q table is updated. Accordingly, the in-memory can be efficiently managed.

In addition, according to an embodiment of the present disclosure, the traffic bandwidth of a user who is in a LAN coverage area is monitored through the OpenFlow-based SDN during clustering timings. The traffic bandwidth of the ERP user who has left the LAN coverage area and makes a request for login in the ERP is monitored through the WAN controller of the OpenFlow-based SDN during non-clustering timings. Therefore, the data transmission rate is enhanced, and security is enhanced because distributed communication is performed over the LAN and the WAN for each user and each ERP user.

According to an embodiment of the present disclosure, the user traffic for the ERP user and the user can be monitored through the local network, and loading or unloading of table partitions of the in-memory can be managed on the basis of the monitored user traffic so that the in-memory can be managed regardless of Internet access.

Although the present disclosure has been described with limited embodiments and the drawings, the present disclosure is not limited to the embodiments, and various modifications, additions, and substitutions are possible from the description of the embodiments by those skilled in the art to which the present disclosure pertains. Accordingly, the spirit of the present disclosure should be understood by the appended claims and all equivalents thereof will fall within the scope of the spirit of the present disclosure.

INDUSTRIAL APPLICABILITY

According to an in-memory management system and method using user traffic, the traffic bandwidth of the user or ERP user is monitored. A login message of the user or ERP user of which the traffic bandwidth is higher than the predetermined threshold value as a result of monitoring is loaded to the table partition set, the SQL Plan cache, and the SQL view cache of the in-memory DB, and the Q table is updated. When a login message of another user in the table is received, the table partition set, the SQL Plan cache, and the SQL view cache of the in-memory DB are moved to delta storage and the Q table is updated. Accordingly, the in-memory can be efficiently managed. In addition, the traffic bandwidth of a user who is in a LAN coverage area is monitored through the OpenFlow-based SDN during clustering timings. The traffic bandwidth of the ERP user who has left the LAN coverage area and makes a request for login in the ERP is monitored through the WAN controller of the OpenFlow-based SDN during non-clustering timings. Therefore, the data transmission rate is enhanced, and security is enhanced because distributed communication is performed over the LAN and the WAN for each user and each ERP user. The user traffic for the ERP user and the user can be monitored through the local network, and loading or unloading of table partitions of the in-memory can be managed on the basis of the monitored user traffic so that the in-memory can be managed regardless of Internet access. Accordingly, it is possible to achieve significant progress in terms of accuracy and reliability of the operation of the in-memory management system and method using user traffic, and furthermore, performance efficiency. The in-memory not only has sufficient possibility of commercialization or sales but can also be clearly implemented in practice. Therefore, the present disclosure is industrially applicable.

What is claimed is:

1. An in-memory management system using user traffic, unloading a table partition set unused, and removing the same from memory, the system comprising:
    at least one enterprise resource planning (ERP) backend virtual machine (VM) performing marking and clustering on all queries by using, as inputs, an input query log of a user, a predetermined minimum number of queries, and a predetermined minimum time gap;
    a network controller monitoring traffic bandwidth during clustering timings determined with a maximum time and a minimum time of clusters for the marked queries of the user; and
    at least one in-memory DB provided in number the same as the at least one ERP backend VM, the least one in-memory DB managing loading or unloading of a table partition set, a Structured Query Language (SQL) Plan cache, and an SQL view cache on the basis of the traffic bandwidth of the user monitored by the network controller, and managing a query (Q) table.

2. An in-memory management method using user traffic and being performed by the in-memory management system of claim 1, the method comprising:
    performing, by the at least one enterprise resource planning (ERP) backend virtual machine (VM) at a clustering step, making and clustering on all the queries by using, as inputs, the input query log of the user, the predetermined minimum number of queries, and the predetermined minimum time gap;
    monitoring, by the network controller at a monitoring step, the traffic bandwidth of the user during the clustering timings determined with the maximum time and the minimum time of the clusters for the marked queries of the user; and
    managing, by the at least one in-memory DB provided in number the same as the at least one ERP backend VM at an in-memory management step, loading or unloading of the table partition set, the Structured Query Language (SQL) Plan cache, and the SQL view cache on the basis of the traffic bandwidth of the user monitored by the network controller, and managing the query (Q) table.

3. The method of claim 2, wherein the clustering step comprises:
    initializing neighbor queries into a null state on the basis of a random query that is randomly selected among all the queries of the user;
    marking the selected random query when the selected random query is unmarked and conditions about the predetermined minimum number of queries and the predetermined minimum time gap are satisfied, and marking all the neighbor queries of the random query and adding the neighbor queries to the cluster; and
    informing the network controller about the maximum time and the minimum time of the clusters for all the queries via the in-memory DB after marking and clustering of all the queries of the user are completed.

4. The method of claim 3, wherein the Q table includes at least one selected from the group of a MAC address of the marked user, the clustering timings determined with the maximum time and the minimum time of the clusters, synchronous and asynchronous communication, an IP address of an ID management module managing the MAC address of the user, and an ERP public internet protocol (IP).

5. The method of claim 2, wherein at the monitoring step, when the user is in a LAN coverage area, the user is identified using a user MAC address of an ID management module during the clustering timings through an OpenFlow-based SDN, and the traffic bandwidth of the user is monitored.

6. The method of claim 2, wherein the monitoring step comprises:
    starting monitoring of the traffic bandwidth of the user during the clustering timings of the user, and removing all flow entries of the user;
    acquiring a flow entry of an OpenFlow table when loading of a default table partition set of the user, the SQL Plan cache, and the SQL view cache stored in the in-memory DB fails, and monitoring the traffic bandwidth of the user; and
    informing the in-memory DB about the monitored traffic bandwidth of the user.

7. The method of claim 6, wherein the monitoring step comprises:
    adding, when a Packet-In message is received on the basis of the OpenFlow during monitoring of the traffic bandwidth of the user, a flow entry with the received Packet-In message;
    processing a packet received through the added flow entry;
    identifying the user with a user MAC address of the processed packet and monitoring the traffic bandwidth of the user; and
    informing the in-memory DB about the monitored traffic bandwidth of the user.

8. The method of claim 7, wherein the informing of the in-memory DB about the traffic bandwidth of the user comprises:
    informing of the in-memory DB that the user traffic is equal to or lower than a predetermined threshold value when the traffic bandwidth of the user is equal to or lower than the threshold value, and removing the generated flow entry by using a flow modification packet; and updating the in-memory DB with the traffic bandwidth of the user when the user traffic is higher than the threshold value and communication between the network controller is the in-memory DB is synchronous communication, and receiving a reply message of the in-memory DB, and adding a flow entry to a flow table.

9. The method of claim 8, wherein the informing of the in-memory DB about the traffic bandwidth of the user comprises:

informing the in-memory DB about the traffic bandwidth of the user that is a result of monitoring when the traffic bandwidth of the user is higher than the threshold value and communication between the network controller and the in-memory DB is asynchronous communication; and adding the flow entry to the flow table.

10. The method of claim 5, wherein the traffic bandwidth is measured as a difference in an OpenFlow start reply packet that is received through the SDN after an OpenFlow start request packet is transmitted to the SDN on the basis of the OpenFlow.

11. The method of claim 5, wherein the monitoring step further comprises monitoring traffic of an ERP user through the OpenFlow-based SDN with the MAC address of the ERP user acquired on the basis of loading of a partition of a default table of the in-memory DB, wherein the ERP user is a user who has left the LAN coverage area and makes a request for ERP access through a WAN during non-clustering timings.

12. The method of claim 11, wherein the monitoring step comprises:

making, when there is an access request in ERP through the WAN and an ERP IP for which the access request is made is not present in a flow entry of an OpenFlow table, a request to the in-memory DB for the ERP IP by using a Packet-In message based on the OpenFlow, and waiting for reception;

loading the partition of the default table pre-stored in the in-memory DB;

monitoring the traffic bandwidth of the ERP user with the MAC address and identification information of the ERP user stored in a partition set of the default table; and informing the in-memory DB about the traffic bandwidth of the ERP user when communication between the network controller and the in-memory DB is synchronous communication, and receiving a reply message of the in-memory DB, and adding a flow entry of the OpenFlow table.

13. The method of claim 12, wherein the monitoring step further comprises informing the in-memory DB about the traffic bandwidth of the ERP user when communication between the network controller and the in-memory DB is asynchronous communication, and adding the flow entry of the OpenFlow table.

14. The method of claim 13, wherein at the in-memory management step, a login message of the user received from outside through asynchronous communication or synchronous communication is loaded to the table partition set of the in-memory DB, and is loaded to the SQL Plan cache and to the SQL view cache, and the Q table is updated.

15. The method of claim 14, wherein at the in-memory management step, when the user is another user stored in the table, the table partition set, the SQL Plan cache, and the SQL view cache of the in-memory DB are moved to delta storage and the Q table is updated.

16. The method of claim 15, wherein at the in-memory management step, when the user is not another user stored in the table, an unused partition of the table is moved to the delta storage.

* * * * *